(12) United States Patent
Kim

(10) Patent No.: US 12,510,372 B2
(45) Date of Patent: Dec. 30, 2025

(54) TRAFFIC INFORMATION SERVER, DEVICE FOR CONTROLLING VEHICLE, AND METHOD FOR PROVIDING TRAFFIC INFORMATION

(71) Applicants: HYUNDAI MOTOR COMPANY, Seoul (KR); Kia Corporation, Seoul (KR)

(72) Inventor: Han Shik Kim, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 44 days.

(21) Appl. No.: 18/752,200

(22) Filed: Jun. 24, 2024

(65) Prior Publication Data

US 2025/0198791 A1   Jun. 19, 2025

(30) Foreign Application Priority Data

Dec. 13, 2023   (KR) .................. 10-2023-0181223

(51) Int. Cl.
| | | |
|---|---|---|
| G01C 21/00 | (2006.01) | |
| G01C 21/36 | (2006.01) | |
| G08G 1/052 | (2006.01) | |

(52) U.S. Cl.
CPC ..... G01C 21/3807 (2020.08); G01C 21/3691 (2013.01); G08G 1/052 (2013.01)

(58) Field of Classification Search
CPC ............ G01C 21/3807; G01C 21/3691; G01C 21/3658; G01C 21/34; G08G 1/052; G08G 1/0112; G08G 1/0133; G08G 1/0967; G08G 1/0968; G08G 1/0969; G08G 1/0141; G08G 1/0116; G08G 1/20; G01S 19/01

USPC ......................................................... 701/423
See application file for complete search history.

(56) References Cited

U.S. PATENT DOCUMENTS

| | | | | |
|---|---|---|---|---|
| 2016/0171886 | A1* | 6/2016 | Vorona ................. | G08G 1/0104 701/119 |
| 2020/0143673 | A1* | 5/2020 | Lee ....................... | G08G 1/0133 |
| 2024/0046780 | A1* | 2/2024 | Oyagi ................. | G01C 21/3837 |

FOREIGN PATENT DOCUMENTS

| | | | |
|---|---|---|---|
| CN | 209822021 | * | 12/2019 |
| KR | 2011082870 | * | 7/2011 |

* cited by examiner

*Primary Examiner* — Muhammad Shafi
(74) *Attorney, Agent, or Firm* — MORGAN, LEWIS & BOCKIUS LLP

(57) ABSTRACT

In a traffic information server, a device for controlling a vehicle, and a method for providing traffic information, the traffic information server receives, from precise positioning-performing vehicles that perform precise positioning on a lane basis, lane-basis travel data including at least one of lane-basis locations of the precise positioning-performing vehicles or velocities of the precise positioning-performing vehicles, or any combination thereof, receives, from imprecise positioning-performing vehicles incapable of performing the precise positioning, road-basis travel data including at least one of road-basis locations of the imprecise positioning-performing vehicles or velocities of the imprecise positioning-performing vehicles, or any combination thereof, and generates lane-basis traffic information based on at least one of the lane-basis travel data or the road-basis travel data, or any combination thereof.

15 Claims, 7 Drawing Sheets

TRAFFIC INFORMATION SERVER, DEVICE FOR CONTROLLING VEHICLE, AND METHOD FOR PROVIDING TRAFFIC INFORMATION

CROSS-REFERENCE TO RELATED APPLICATION

The present application claims priority to Korean Patent Application No. 10-2023-0181223, filed on Dec. 13, 2023, the entire contents of which is incorporated herein for all purposes by this reference.

BACKGROUND OF THE PRESENT DISCLOSURE

Field of the Present Disclosure

The present disclosure relates to a traffic information server, a device for controlling a vehicle, and a method for providing traffic information, and more specifically, to a technology of generating the traffic information of the vehicle.

Description of Related Art

Recently, as roads have become more complex and traffic volume has rapidly increased, many drivers drive their vehicles relying on a system that provides a route guidance based on a global positioning system (GPS) or the like.

A navigation system is an example of the system that provides the route guidance based on the GPS as above, and is a system that provides guidance on an optimal route to a destination to the driver of the vehicle.

The navigation system provides the driver with a route reflecting traffic information. The traffic information may include information on locations or velocities of the vehicles. A server calculates an estimated time of arrival (ETA) to the destination based on the traffic information collected from the vehicles and provides a user with the estimated time of arrival and the route.

Conventionally, a route in which a plurality of lanes included in a road on which the vehicle travels are not differentiated from each other was provided to the user. For example, regardless of a lane in which the user travels, information on whether there is a traffic congestion was provided to the user based on an average velocity of the vehicles traveling on the same road.

Accordingly, even though whether there is the traffic congestion is different for each of a left-turn lane, a straight lane, and a right-turn lane included in the road on which the vehicle is traveling, the user is only informed of whether there is the congestion determined based on the average velocity of the vehicles on the road on which the vehicle is traveling.

Therefore, there is a need to generate the traffic information by collecting the locations of the vehicles on a lane basis. Furthermore, the lane-basis traffic information needs to be provided to both a vehicle which is able to perform lane-basis positioning and a vehicle which is not able to perform the lane-basis positioning.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a traffic information server, a device for controlling a vehicle, and a method for providing traffic information which may collect travel data of vehicles on a lane basis and generate lane-basis traffic information to improve accuracy of traffic information, estimated time of arrival, and route guidance provided to a user.

Another aspect of the present disclosure provides a traffic information server, a device for controlling a vehicle, and a method for providing traffic information which may provide information on whether there is a traffic congestion for each lane to a user via lane-basis traffic information if there is a plurality of lanes on a route of a user.

Another aspect of the present disclosure provides a traffic information server, a device for controlling a vehicle, and a method for providing traffic information that provide lane-basis traffic information to both a vehicle provided with a precise positioning technology and a vehicle not provided with the precise positioning technology, so that a user using the vehicle not provided with the precise positioning technology may also receive information on whether there is a traffic congestion for each lane.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a traffic information server includes a first memory that stores program instructions, and a first processor that executes the program instructions, the first processor receives, from precise positioning-performing vehicles that perform precise positioning on a lane basis, lane-basis travel data including at least one of lane-basis locations of the precise positioning-performing vehicles or velocities of the precise positioning-performing vehicles, or any combination thereof, receives, from imprecise positioning-performing vehicles incapable of performing the precise positioning, road-basis travel data including at least one of road-basis locations of the imprecise positioning-performing vehicles or velocities of the imprecise positioning-performing vehicles, or any combination thereof, and generates lane-basis traffic information based on at least one of the lane-basis travel data or the road-basis travel data, or any combination thereof, and a lane where the precise positioning-performing vehicles are traveling is included on a road where the imprecise positioning-performing vehicles are traveling.

In an exemplary embodiment of the present disclosure, the first processor is configured to generate the lane-basis traffic information by reflecting a factor value regarding a weight based on the velocities of the imprecise positioning-performing vehicles to the road-basis travel data.

In an exemplary embodiment of the present disclosure, the first processor is configured to generate lane-basis route guidance information including at least one of data on whether the lane is congested determined on the lane basis or data on a route guided on the lane basis, or any combination thereof, based on the lane-basis traffic information.

In an exemplary embodiment of the present disclosure, the first processor is configured to transmit data regarding the lane-basis route guidance information to at least one of the precise positioning-performing vehicles or the imprecise positioning-performing vehicles, or any combination thereof.

In an exemplary embodiment of the present disclosure, the lane-basis locations of the precise positioning-performing vehicles may be generated as a high definition map including at least one of lane information, a guardrail, a curvature of the road, a slope of the road, a traffic light location, a sign location, or a traffic marking, or any combination thereof is map matched with location data of the precise positioning-performing vehicles.

According to another aspect of the present disclosure, a device for controlling a vehicle includes a second memory that stores program instructions, and a second processor that executes the program instructions, the second processor is configured to transmit travel data of a host vehicle including at least one of a location of the host vehicle or a velocity of the host vehicle, or any combination thereof to a traffic information server, and receives, from the traffic information server, lane-basis traffic information generated based on at least one of lane-basis travel data of other vehicles that perform precise positioning on a lane basis, road-basis travel data of other vehicles incapable of performing the precise positioning, or the travel data of the host vehicle, or any combination thereof, a lane where the other vehicles that perform the precise positioning are traveling is included in a road where the other vehicles incapable of performing the precise positioning are traveling, the lane-basis travel data of the other vehicles that perform the precise positioning includes at least one of lane-basis locations of the other vehicles that perform the precise positioning or velocities of the other vehicles that perform the precise positioning in the lane, or any combination thereof, and the road-basis travel data of the other vehicles incapable of performing the precise positioning includes at least one of road-basis locations of the other vehicles incapable of performing the precise positioning or velocities of the other vehicles incapable of performing the precise positioning on the road, or any combinations thereof.

In an exemplary embodiment of the present disclosure, the second processor is configured to transmit lane-basis travel data of the host vehicle, including at least one of a lane-basis location of the host vehicle or a velocity of the host vehicle in the lane, or any combination thereof, to the traffic information server among the travel data of the host vehicle, based on a fact that the host vehicle corresponds to a precise positioning-performing vehicle that performs the precise positioning on the lane basis.

In an exemplary embodiment of the present disclosure, the second processor may correct the location of the host vehicle to a lane-basis location of the host vehicle including a location in a sub-meter unit using a positioning technology based on at least one of a global positioning system (GPS) or a global navigation satellite system (GNSS), or any combination thereof, based on a fact that the host vehicle corresponds to a precise positioning-performing vehicle that performs the precise positioning on the lane basis.

In an exemplary embodiment of the present disclosure, the second processor is configured to transmit road-basis travel data of the host vehicle, including at least one of a road-basis location of the host vehicle or a velocity of the host vehicle on the road, or any combination thereof, to the traffic information server among the travel data of the host vehicle, based on a fact that the host vehicle does not correspond to a precise positioning-performing vehicle that performs the precise positioning on the lane basis.

In an exemplary embodiment of the present disclosure, the second processor may correct the location of the host vehicle to a road-basis location of the host vehicle using a dead reckoning (DR) technology based on at least one of information on the velocity of the host vehicle, information on a gyro of the host vehicle, or information on a travel direction of the host vehicle, or any combination thereof, based on a fact that the host vehicle does not correspond to a precise positioning-performing vehicle that performs the precise positioning on the lane basis.

In an exemplary embodiment of the present disclosure, the second processor may receive lane-basis route guidance information including at least one of data on whether the lane is congested determined on the lane basis or data on a route guided on the lane basis, or any combination thereof among the lane-basis traffic information.

In an exemplary embodiment of the present disclosure, the second processor may provide information on at least one of whether a left-turn lane is congested, whether a right-turn lane is congested, whether a straight lane is congested, or whether a U-turn lane is congested, or any combination thereof to a user by being differentiated for each lane, based on the lane-basis route guidance information.

In an exemplary embodiment of the present disclosure, the second processor may map match a high definition map including at least one of lane information, a guardrail, a curvature of the road, a slope of the road, a traffic light location, a sign location, or a traffic marking, or any combination thereof with location data of the host vehicle to generate the lane-basis location of the host vehicle.

According to another aspect of the present disclosure, a method for providing traffic information includes transmitting, by precise positioning-performing vehicles that perform precise positioning on a lane basis, lane-basis travel data including at least one of lane-basis locations of the precise positioning-performing vehicles or velocities of the precise positioning-performing vehicles, or any combination thereof to a traffic information server, transmitting, by imprecise positioning-performing vehicles incapable of performing the precise positioning, road-basis travel data including at least one of road-basis locations of the imprecise positioning-performing vehicles or velocities of the imprecise positioning-performing vehicles, or any combination thereof to the traffic information server, and generating, by the traffic information server, lane-basis traffic information based on at least one of the lane-basis travel data or the road-basis travel data, or any combination thereof, and a lane where the precise positioning-performing vehicles are traveling is included on a road where the imprecise positioning-performing vehicles are traveling.

In an exemplary embodiment of the present disclosure, the transmitting, by the precise positioning-performing vehicles that perform the precise positioning on the lane basis, of the lane-basis travel data including at least one of the lane-basis locations of the precise positioning-performing vehicles or the velocities of the precise positioning-performing vehicles, or any combination thereof to the traffic information server may include correcting, by the precise positioning-performing vehicle, the location of the precise positioning-performing vehicle to a lane-basis location of the precise positioning-performing vehicle including a location in a sub-meter unit using a positioning technology based on at least one of a global positioning system (GPS) or a global navigation satellite system (GNSS), or any combination thereof.

In an exemplary embodiment of the present disclosure, the transmitting, by the imprecise positioning-performing vehicles incapable of performing the precise positioning, of the road-basis travel data including at least one of the road-basis locations of the imprecise positioning-performing vehicles or the velocities of the imprecise positioning-performing vehicles, or any combination thereof to the traffic information server may include correcting, by the imprecise positioning-performing vehicles, the locations of the imprecise positioning-performing vehicles to road-basis locations of the imprecise positioning-performing vehicles using a dead reckoning (DR) technology based on at least one of information on the velocities of the imprecise positioning-performing vehicles, information on a gyro of the imprecise positioning-performing vehicles, or information on a travel direction of the imprecise positioning-performing vehicles, or any combination thereof.

In an exemplary embodiment of the present disclosure, the generating, by the traffic information server, of the lane-basis traffic information based on at least one of the lane-basis travel data or the road-basis travel data, or any combination thereof may include generating, by the traffic information server, the lane-basis traffic information by reflecting a factor value regarding a weight based on the velocities of the imprecise positioning-performing vehicles to the road-basis travel data.

In an exemplary embodiment of the present disclosure, the method may further include generating, by the traffic information server, lane-basis route guidance information including at least one of data on whether the lane is congested determined on the lane basis or data on a route guided on the lane basis, or any combination thereof, based on the traffic information.

In an exemplary embodiment of the present disclosure, the method may further include transmitting, by the traffic information server, data regarding the lane-basis route guidance information to at least one of the precise positioning-performing vehicles or the imprecise positioning-performing vehicles, or any combination thereof.

In an exemplary embodiment of the present disclosure, the method may further include providing, by the vehicles that have received the data regarding the lane-basis route guidance information, information on at least one of whether a left-turn lane is congested, whether a right-turn lane is congested, whether a straight lane is congested, or whether a U-turn lane is congested, or any combination thereof to a user by being differentiated for each lane, based on the lane-basis route guidance information.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
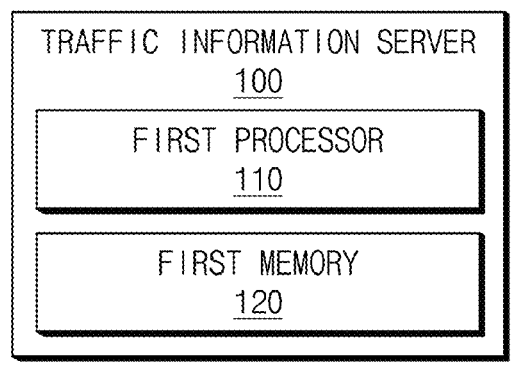
FIG. 1 is a block diagram showing a traffic information server according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Furthermore, an expression "at least one of A, B, or C or any combination thereof" may include "A, or B, or C, or AB, or BC, or AC, or ABC, which are combinations thereof".

Furthermore, unless otherwise defined, all terms including technical and scientific terms used herein include the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Hereinafter, various exemplary embodiments of the present disclosure will be described in detail with reference to FIGS. 1 to 7.

FIG. 1 is a block diagram showing a traffic information server according to an exemplary embodiment of the present disclosure.

According to an exemplary embodiment of the present disclosure, a traffic information server 100 may include a first processor 110 and a first memory 120. The configuration of the traffic information server 100 shown in FIG. 1 is merely illustrative, and embodiments of the present disclosure are not limited thereto. For example, the traffic information server 100 may further include components not shown in FIG. 1.

According to an exemplary embodiment of the present disclosure, the first memory 120 may store instructions or data. For example, the first memory 120 may store one instruction or two or more instructions that enable the traffic information server 100 to perform various operations if executed by the first processor 110.

According to an exemplary embodiment of the present disclosure, the first memory 120 may be implemented as a single chipset with the first processor 110, and may store various information associated with the traffic information server 100. For example, the first memory 120 may store information on an operation history of the first processor 110.

According to an exemplary embodiment of the present disclosure, the first memory 120 may include a non-volatile memory (a read only memory; ROM) and a volatile memory (a random access memory; RAM). For example, travel data or the like received from precise positioning-performing vehicles or imprecise positioning-performing vehicles may be stored in the first memory 120.

According to an exemplary embodiment of the present disclosure, the first processor 110 may receive, from the precise positioning-performing vehicles that perform precise positioning on a lane basis, lane-basis travel data including at least one of lane-basis locations of the precise positioning-performing vehicles or velocities of the precise positioning-performing vehicles, or any combination thereof. In this regard, the information included in the lane-basis travel data are merely illustrative, and the present disclosure is not limited thereto. For example, the lane-basis travel data may further include information other than the lane-basis locations of the precise positioning-performing vehicles and the velocities of the precise positioning-performing vehicles.

According to an exemplary embodiment of the present disclosure, the first processor 110 may receive, from the imprecise positioning-performing vehicles that are not able to perform the precise positioning, road-basis travel data including at least one of road-basis locations of the imprecise positioning-performing vehicles or velocities of the imprecise positioning-performing vehicles, or any combination thereof. In this regard, the information included in the road-basis travel data are merely illustrative, and the present disclosure is not limited thereto. For example, the road-basis travel data may further include information other than the road-basis locations of the imprecise positioning-performing vehicles and the velocities of the imprecise positioning-performing vehicles.

According to an exemplary embodiment of the present disclosure, the precise positioning-performing vehicles may include vehicles provided with a precise positioning technology. The precise positioning technology may include a technology that may determine a location with an accuracy of about 30 cm based on an open space using global navigation satellite system (GNSS) correction information.

According to an exemplary embodiment of the present disclosure, the imprecise positioning-performing vehicles may include vehicles that are not provided with the precise positioning technology. For example, the imprecise positioning-performing vehicles may include vehicles provided with a technology which may only measure the location on the road basis which is greater than the lane basis. Accordingly, the first processor 110 may only determine the road-basis locations of the imprecise positioning-performing vehicles, not lane-basis locations of the imprecise positioning-performing vehicles, via data received from the imprecise positioning-performing vehicles.

According to an exemplary embodiment of the present disclosure, the lane in which the precise positioning-performing vehicles are traveling may be included in the road on which the imprecise positioning-performing vehicles are traveling. In other words, the precise positioning-performing vehicles and the imprecise positioning-performing vehicles may be traveling on the same road. For example, the precise positioning-performing vehicles and the imprecise positioning-performing vehicles may be traveling in the same lane on the same road, or may be traveling in different lanes on the same road.

According to an exemplary embodiment of the present disclosure, road infrastructure for the precise positioning may include a high definition map. The high definition map may include 3D road environment information such as line information, a lane information, a guardrail, a road curvature, a road slope, a traffic light location, a sign location, and a traffic marking. For example, the first processor 110 may store the high definition map in the first memory 120. The high definition map stored in the first memory 120 may be updated periodically via communication with the server.

According to an exemplary embodiment of the present disclosure, the precise positioning-performing vehicles may include vehicles provided with a technology of map matching the high definition map with the locations of the precise positioning-performing vehicles. The map matching may include a technology of estimating an exact location and a travel route of a vehicle by mapping the measured location of the vehicle to a road network. For example, the map matching may be utilized for navigation route guidance, fare determination based on the travel route of a taxi or the like, traffic flow analysis, travel direction determination, and the like.

According to an exemplary embodiment of the present disclosure, the lane-basis locations of the precise positioning-performing vehicles may be generated as the high definition map including at least one of the lane information, the guardrail, the road curvature, the road slope, the traffic light location, the sign location, or the traffic marking, or any combination thereof is map matched with location data of the precise positioning-performing vehicles.

For example, the lane-basis location received by the first processor 110 from the precise positioning-performing vehicle may include the data map matched in the precise positioning-performing vehicle. In other words, the precise positioning-performing vehicles may transmit the data obtained by map matching the high definition map with the locations of the precise positioning-performing vehicles to the traffic information server.

According to an exemplary embodiment of the present disclosure, the first processor 110 may identify which lane the precise positioning-performing vehicles are traveling or stopping in via the lane-basis locations received from the precise positioning-performing vehicles. Furthermore, the first processor 110 may also identify which road the precise positioning-performing vehicles are traveling or stopping on.

According to an exemplary embodiment of the present disclosure, the first processor 110 may identify which road the imprecise positioning-performing vehicles are traveling or stopping on via the road-basis locations received from the imprecise positioning-performing vehicles. For example, the first processor 110 may identify where the imprecise positioning-performing vehicles exist on the road on which they are traveling.

In an exemplary embodiment of the present disclosure, if both the precise positioning-performing vehicles and the imprecise positioning-performing vehicles are traveling on a road K and the road K includes a total of four lanes, the first processor 110 may identify which lane among the four lanes of the road K the precise positioning-performing vehicles are traveling in, and may identify that the imprecise positioning-performing vehicles are traveling on the road K.

According to an exemplary embodiment of the present disclosure, the first processor 110 may be configured to generate lane-basis traffic information based on at least one of the lane-basis travel data or the road-basis travel data, or any combination thereof.

According to an exemplary embodiment of the present disclosure, the lane-basis traffic information generated by the first processor 110 may include information in which the real-time locations and velocities of the vehicles are differentiated for each lane. For example, if a specific road includes a plurality of lanes, real-time locations and velocities of vehicles traveling in each lane may be included in the lane-basis traffic information. The velocities included in the lane-basis traffic information may include information on travel directions and speeds of the vehicles in the corresponding lane. The vehicles whose real-time locations and velocities are identified for each lane may be the precise positioning-performing vehicles that are able to perform the precise positioning.

According to an exemplary embodiment of the present disclosure, road-basis traffic information generated by the first processor 110 may include information in which the real-time locations and velocities of the vehicles are differentiated for each road. For example, the real-time locations and velocities of the vehicles traveling on the specific road may be included in the road-basis traffic information. In this regard, even though the vehicles traveling on the specific road are traveling in different lanes, the real-time locations or velocities of the vehicles may not be differentiated for each lane. The vehicles whose real-time locations and velocities are identified for each road may be the imprecise positioning-performing vehicles that are not able to perform the precise positioning.

According to an exemplary embodiment of the present disclosure, the first processor 110 may be configured to generate the lane-basis traffic information by reflecting a factor value regarding a weight based on the velocities of the imprecise positioning-performing vehicles to the road-basis travel data.

For example, the factor value regarding the weight based on the velocities of the imprecise positioning-performing vehicles may be calculated based on a degree of traffic congestion determined depending on the velocities of the imprecise positioning-performing vehicles. In an exemplary embodiment of the present disclosure, if the velocities of the imprecise positioning-performing vehicles are relatively low, the degree of the traffic congestion may be determined to be high, and if the velocities of the imprecise positioning-performing vehicles are relatively high, the degree of the traffic congestion may be determined to be low.

For example, even though the lane-basis traffic information generated by the first processor 110 includes only the information differentiated for each lane, the road-basis travel data may be reflected to the lane-basis traffic information. In an exemplary embodiment of the present disclosure, the first processor 110 may assign the factor value based on the velocities of the imprecise positioning-performing vehicles traveling on the road including the corresponding lane to data on whether there is a congestion determined for each lane, ultimately determining whether there is the congestion for each lane.

According to an exemplary embodiment of the present disclosure, the first processor 110 may collect the data reflecting the factor value regarding the weight based on the velocities of the imprecise positioning-performing vehicles to the road-basis travel data as the road-basis travel data. Furthermore, the first processor 110 may reflect the collected road-basis travel data to the lane-basis traffic information.

According to an exemplary embodiment of the present disclosure, based on the traffic information, the first processor 110 may be configured to generate lane-basis route guidance information including at least one of data on whether the lane is congested determined on the lane basis or data on a route guided on the lane basis, or any combination thereof.

According to an exemplary embodiment of the present disclosure, the first processor 110 may be configured to generate the route guidance information based on the traffic information. The route guidance information may include information necessary to guide a route to a destination of the vehicle. For example, the route guidance information may include a road on which the vehicle must travel to reach the destination, the real-time location, a gas station on the route, traffic accident information, traffic congestion information, traffic light information, and the like.

According to an exemplary embodiment of the present disclosure, the first processor 110 may be configured to generate the lane-basis route guidance information based on the traffic information. For example, the lane-basis route guidance information may include the data on whether the lane is congested determined on the lane basis, the data on the route guided on the lane basis, and the like.

According to an exemplary embodiment of the present disclosure, the data on whether there is the congestion determined on the lane basis may include data on whether there is the congestion determined for each lane. Whether there is the congestion may be determined by the degree of traffic congestion, and the degree of traffic congestion may be determined based on the velocities or the number of vehicles traveling in each lane. In an exemplary embodiment of the present disclosure, if the specific road includes a first lane, a second lane, and a third lane, the data on whether there is the congestion determined on the lane basis may include information indicating that the degree of traffic congestion is low in the first lane, the degree of traffic congestion is high in the second lane, and the degree of traffic congestion is very high in the third lane.

According to an exemplary embodiment of the present disclosure, the data on the route guidance on the lane basis may include information which may guide the route to the destination of the vehicle at a lane-basis level. For example, the data on the route guided on the lane basis may include, based on the lane in which the vehicle is traveling, a lane in which the vehicle must travel to reach the destination, a time point at which a lane change is necessary, and the like.

According to an exemplary embodiment of the present disclosure, the first processor 110 may be configured to generate the lane-basis route guidance information including a degree of traffic congestion of the lane in which the vehicle must travel to reach the destination.

According to an exemplary embodiment of the present disclosure, the first processor 110 may be configured to generate various routes for the vehicle to reach the destination, considering the degree of traffic congestion for each lane. For example, a route to reach the destination in the least amount of time may not include a lane with a high degree of traffic congestion. As an exemplary embodiment of the present disclosure, a route to reach the destination with a minimal cost may also include the lane with the high degree of traffic congestion.

According to an exemplary embodiment of the present disclosure, the first processor 110 may transmit data regarding lane-basis route guidance information to at least one of the precise positioning-performing vehicles or the imprecise positioning-performing vehicles, or any combination thereof.

According to an exemplary embodiment of the present disclosure, even the imprecise positioning-performing vehicles that are not able to determine the lane-basis locations thereof may receive the data regarding the lane-basis route guidance information. For example, even the imprecise positioning-performing vehicles that are not provided with the precise positioning technology may receive a route guidance with whether there is the congestion for each lane indicated from the traffic information server. Accordingly, users of the imprecise positioning-performing vehicles may also receive an optimal route that reflects whether there is the congestion for each lane or the like.

According to an exemplary embodiment of the present disclosure, the first processor 110 may transmit the data regarding the lane-basis route guidance information to the precise positioning-performing vehicles and the imprecise positioning-performing vehicles via a communication module of the traffic information server or an antenna of the traffic information server.

According to an exemplary embodiment of the present disclosure, the precise positioning-performing vehicles or the imprecise positioning-performing vehicles may receive the data regarding the lane-basis route guidance information via respective communication modules or antennae included therein.

Figure 2:
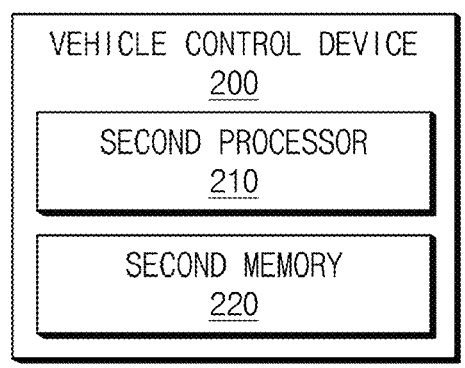
FIG. 2 is a block diagram showing a vehicle control device according to an exemplary embodiment of the present disclosure.

FIG. 2 is a block diagram showing a vehicle control device according to an exemplary embodiment of the present disclosure.

According to an exemplary embodiment of the present disclosure, a vehicle control device 200 may include a second processor 210 and a second memory 220. The configuration of the vehicle control device 200 shown in FIG. 2 is merely illustrative, and embodiments of the present disclosure are not limited thereto. For example, the vehicle control device 200 may further include components not shown in FIG. 2.

According to an exemplary embodiment of the present disclosure, the second memory 220 may store instructions or data. For example, the second memory 220 may store one instruction or two or more instructions that cause the vehicle control device 200 to perform various operations if executed by the second processor 210.

According to an exemplary embodiment of the present disclosure, the second memory 220 may be implemented as a single chipset with the second processor 210 and may store various information associated with the vehicle control device 200. For example, the second memory 220 may store information on an operation history of the second processor 210.

According to an exemplary embodiment of the present disclosure, the second memory 220 may include a non-volatile memory (a read only memory; ROM) and a volatile memory (a random access memory; RAM). For example, travel data or the like of a host vehicle including at least one of a location of the host vehicle or a velocity of the host vehicle, or any combination thereof may be stored in the second memory 220.

According to an exemplary embodiment of the present disclosure, the second processor 210 may transmit the travel data of the host vehicle including at least one of the location of the host vehicle or the velocity of the host vehicle, or any combination thereof to the traffic information server. In this regard, the information included in the travel data of the host vehicle are merely illustrative, and the present disclosure is not limited thereto. For example, the travel data of the host vehicle may further include information other than the location of the host vehicle and the velocity of the host vehicle.

According to an exemplary embodiment of the present disclosure, the second processor 210 may receive lane-basis traffic information from the traffic information server. For example, the lane-basis traffic information may be generated in the traffic information server.

According to an exemplary embodiment of the present disclosure, the lane-basis traffic information may be generated based on lane-basis travel data of other vehicles that perform the precise positioning on the lane basis, road-basis travel data of other vehicles that are not able to perform the precise positioning, and the travel data of the host vehicle.

According to an exemplary embodiment of the present disclosure, other vehicles that perform the precise positioning on the lane basis may include the precise positioning-performing vehicles described in FIG. 1. Other vehicles that are not able to perform the precise positioning may include the imprecise positioning-performing vehicles described in FIG. 1.

According to an exemplary embodiment of the present disclosure, the lane-basis travel data of other vehicles that perform the precise positioning may include lane-basis locations of other vehicles that perform the precise positioning and velocities of other vehicles that perform the precise positioning in the lane. For example, the lane-basis travel data of other vehicles that perform the precise positioning may include information on which lane each vehicle is traveling in.

According to an exemplary embodiment of the present disclosure, the road-basis travel data of other vehicles that are not able to perform the precise positioning may include road-basis locations of other vehicles that are not able to perform the precise positioning and velocities of other vehicles that are not able to perform the precise positioning on the road. For example, the road-basis travel data of other vehicles that are not able to perform the precise positioning may include information on which road each vehicle is traveling on. As an exemplary embodiment of the present disclosure, the road-basis travel data of other vehicles may not include information on which lane each vehicle is traveling in.

According to an exemplary embodiment of the present disclosure, the lane in which other vehicles that perform the precise positioning are traveling may be included in the road on which other vehicles that are not able to perform the precise positioning are traveling. In other words, other vehicles that perform the precise positioning and other vehicles that are not able to perform the precise positioning may be traveling on the same road. For example, other vehicles that perform the precise positioning and other vehicles that are not able to perform the precise positioning may be traveling in the same lane on the same road, or may be traveling in different lanes on the same road.

According to an exemplary embodiment of the present disclosure, the vehicle control device 200 may include an antenna. For example, the second processor 210 may transmit the travel data of the host vehicle to the traffic information server via the antenna of the vehicle control device 200. Additionally, the second processor 210 may receive the lane-basis traffic information from the traffic information server via the antenna of the vehicle control device 200.

According to an exemplary embodiment of the present disclosure, if the host vehicle corresponds to the precise positioning-performing vehicle that performs the precise positioning on the lane basis, the second processor 210 may transmit lane-basis travel data of the host vehicle including at least one of a lane-basis location of the host vehicle or a velocity of the host vehicle in the lane, or any combination thereof to the traffic information server.

For example, if the host vehicle corresponds to the precise positioning-performing vehicle, the second processor 210 may collect information on which lane the host vehicle is traveling in and the velocity at which the host vehicle is traveling in the lane. The second processor 210 may classify the information on the lane in which the host vehicle is traveling into the lane-basis travel data of the host vehicle. Furthermore, the second processor 210 may transmit the lane-basis travel data of the host vehicle to the traffic information server via an antenna of the host vehicle.

According to an exemplary embodiment of the present disclosure, if the host vehicle corresponds to the precise positioning-performing vehicle that performs the precise positioning on the lane basis, the second processor 210 may use a positioning technology based on at least one of a global positioning system (GPS) or a global navigation satellite system (GNSS), or any combination thereof. In this regard, the positioning technology is merely an exemplary embodiment of the present disclosure, and various positioning technologies using a satellite in addition to the GPS and the GNSS may be used. For example, the positioning technologies used by the second processor 210 may include a global navigation satellite system (GLONASS), a European satellite navigation system (ALILEO), a Beidou (北斗, Compass), and the like.

According to an exemplary embodiment of the present disclosure, the second processor 210 may correct the location of the host vehicle into a location in a sub-meter unit using the positioning technology such as the GPS and the GNSS. For example, the second processor 210 may be configured to determine the lane-basis location of the host vehicle by correcting the location of the host vehicle into the sub-meter-unit location. The second processor 210 may be configured to determine which lane the host vehicle is traveling in.

According to an exemplary embodiment of the present disclosure, the second processor 210 may be configured to generate the lane-basis location of the host vehicle by map matching a high definition map including at least one of a lane information, a guardrail, a road curvature, a road slope, a traffic light location, a sign location, or a traffic marking, or any combination thereof with location data of the host vehicle. In this regard, the location data of the host vehicle may refer to data including information on the location of the host vehicle. In the instant case, the host vehicle may include a vehicle provided with the map matching technology and may store the high definition map in the second memory 220.

For example, the high definition map and the map matching technology may be understood to include the same meaning as the high definition map and the map matching technology described in FIG. 1.

According to an exemplary embodiment of the present disclosure, the high definition map stored in the vehicle control device 200 and the high definition map stored in the traffic information server 100 may be understood to be the same map. As an exemplary embodiment of the present disclosure, the high definition map stored in the traffic information server 100 may include a high definition map which is more recent than the high definition map stored in the vehicle control device 200. In the instant case, the high definition map stored in the vehicle control device 200 may be updated to the high definition map stored in the traffic information server 100.

According to an exemplary embodiment of the present disclosure, the second processor 210 may be configured to determine the lane-basis location of the host vehicle by map matching the location of the host vehicle corrected to the sub-meter-unit location with high definition map data. For example, the second processor 210 may be configured to determine which lane the host vehicle is traveling in via the map matching between the location of the host vehicle and the high definition map data.

According to an exemplary embodiment of the present disclosure, if the host vehicle does not correspond to the precise positioning-performing vehicle that performs the precise positioning on the lane basis, the second processor 210 may transmit road-basis travel data of the host vehicle including at least one of a road-basis location of the host vehicle or a velocity of the host vehicle on the road, or any combination thereof among the travel data of the host vehicle to the traffic information server.

For example, if the host vehicle does not correspond to the precise positioning-performing vehicle, the second processor 210 may collect information on which road the host vehicle is traveling on and the velocity at which the host vehicle is traveling on the road. The second processor 210 may classify the information on the road on which the host vehicle is traveling as the road-basis travel data of the host vehicle. Furthermore, the second processor 210 may transmit the road-basis travel data of the host vehicle to the traffic information server via the antenna of the host vehicle. In the instant case, the road-basis travel data of the host vehicle may not include the information on which lane the host vehicle is traveling in.

According to an exemplary embodiment of the present disclosure, if the host vehicle does not correspond to the precise positioning-performing vehicle, the second processor 210 may correct the location of the host vehicle to the road-basis location of the host vehicle using a dead reckoning (DR) technology based on at least one of information on the velocity of the host vehicle, information on a gyro of the host vehicle, or information on a travel direction of the host vehicle, or any combination thereof.

For example, the dead reckoning (DR) technology may include dead reckoning composed of a velocity sensor, a gyro sensor, an acceleration sensor, and the like in addition to a GPS receiver to prevent disconnection of positioning information provided from the GPS receiver.

For example, the host vehicle may be provided with the velocity sensor, the gyro sensor, and the acceleration sensor.

According to an exemplary embodiment of the present disclosure, the second processor 210 may identify the road on which the host vehicle is traveling by correcting the location of the host vehicle to the road-basis location of the host vehicle using the dead reckoning (DR) technology. For example, correction information for correcting the location of the host vehicle may be provided in real time from an external server. As an exemplary embodiment of the present disclosure, the correction information for correcting the location of the host vehicle may be stored in the second memory 220 of the vehicle control device 200.

According to an exemplary embodiment of the present disclosure, the second processor 210 may receive lane-basis route guidance information from the traffic information server. For example, the lane-basis route guidance information may include at least one of data on whether the lane is congested determined on the lane basis or data on a route guided on the lane basis, or any combination thereof.

According to an exemplary embodiment of the present disclosure, the lane-basis route guidance information may be included in the lane-basis traffic information received from the traffic information server. The second processor 210 may identify the lane-basis route guidance information among the lane-basis traffic information received from the traffic information server.

According to an exemplary embodiment of the present disclosure, the data on whether the lane is congested determined on the lane basis may be understood as described in FIG. 1. For example, the data on whether there is the congestion determined on the lane basis may include the data on whether there is the congestion determined for each lane. Whether there is the congestion may be determined by the degree of traffic congestion, and the degree of traffic congestion may be determined based on the velocities or the number of vehicles traveling in each lane.

According to an exemplary embodiment of the present disclosure, the data on the route guided on the lane basis may be understood as described in FIG. 1. For example, the data on the route guided on the lane basis may include the information which may guide the route to the destination of the vehicle at the lane-basis level.

According to an exemplary embodiment of the present disclosure, the second processor 210 may differentiate information on at least one of whether a left-turn lane is congested, whether a right-turn lane is congested, whether a straight lane is congested, or whether a U-turn lane is congested, or any combination thereof for each lane based on the lane-basis route guidance information, and provide the information differentiated for each lane to the user.

For example, the second processor 210 may be configured to determine whether the left-turn lane is congested, the right-turn lane is congested, the straight lane is congested, and the U-turn lane is congested, based on the lane-basis route guidance information. In an exemplary embodiment of the present disclosure, if a specific road includes all of the left-turn lane, the straight lane, and the right-turn lane, the second processor 210 may identify a degree of the traffic congestion of the left-turn lane, a degree of the traffic congestion of the straight lane, and a degree of the traffic congestion of the right-turn lane by being differentiated for each lane.

According to an exemplary embodiment of the present disclosure, if the degree of the traffic congestion of the lane that the user may use to reach the destination is high, the second processor 210 may provide a notification regarding the same to the user. Additionally, the second processor 210 may provide the user with a route to reach the destination without using the lane with the high degree of the traffic congestion. For example, the user may change the route along which the vehicle is traveling based on the degree of the traffic congestion for each lane.

According to an exemplary embodiment of the present disclosure, the second processor 210 may provide the information on whether each lane is congested differentiated for each lane to the user via a display or an audio of the vehicle. For example, the second processor 210 may display the information on whether each lane is congested, differentiated for each lane, on a route guided via a navigation system.

By receiving the lane-basis traffic information or the lane-basis route guidance information, the user may receive more accurate guidance of the optimal route to reach the destination. Accordingly, the user may avoid the traffic congestion and reach the destination based on the estimated time of arrival.

Figure 3:
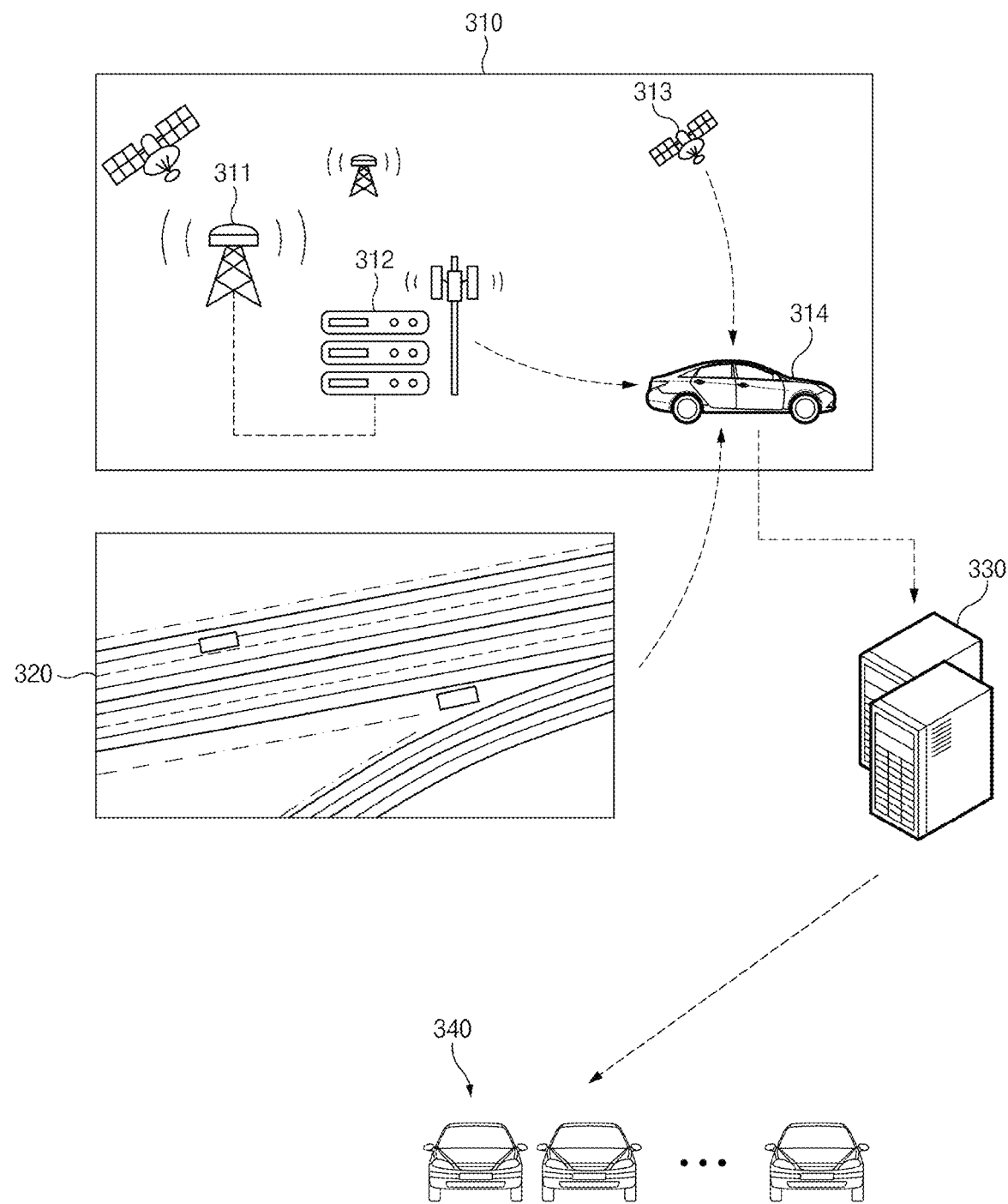
FIG. 3 is a diagram showing an example of a concept in which a traffic information server according to an exemplary embodiment of the present disclosure receives lane-basis travel data from a vehicle, generates lane-basis traffic information, and transmits the lane-basis traffic information to vehicles.

FIG. 3 is a diagram showing an example of a concept in which a traffic information server according to an exemplary embodiment of the present disclosure receives lane-basis travel data from a vehicle, generates lane-basis traffic information, and transmits the lane-basis traffic information to vehicles.

According to an exemplary embodiment of the present disclosure, FIG. 3 may include an example 310 of a process of precisely positioning a location of a vehicle.

In the example 310 of the process of precisely positioning the location of the vehicle according to an exemplary embodiment of the present disclosure, a reference station 311 may receive a GNSS signal related to the location of the vehicle. The reference station 311 may transmit the received GNSS signal to a processing center 312. The processing center 312 may perform correction to reduce an error in the GNSS signal. The processing center 312 may be configured to generate corrected GNSS data with the reduced error in the GNSS signal. The processing center 312 may transmit the corrected GNSS data to a vehicle 314 via the Internet or a satellite 313. The corrected GNSS data may include location information of the vehicle determined with a sub-meter level accuracy.

According to an exemplary embodiment of the present disclosure, the vehicle 314 may use high definition map data 320. The high definition map data 320 may be understood to include the same meaning as the high definition map described in FIG. 1 or 2. For example, the high definition map data 320 may be stored in a memory of the vehicle 314.

According to an exemplary embodiment of the present disclosure, the vehicle 314 may map-match the high definition map data 320 to the location information of the vehicle 314 included in the corrected GNSS data to identify a lane in which the vehicle 314 is traveling. Information on the lane in which the vehicle 314 is traveling may be collected as lane-basis location data of the vehicle 314.

According to an exemplary embodiment of the present disclosure, the vehicle 314 may transmit the lane-basis location data of the vehicle 314 to a traffic information server 330. For example, the traffic information server 330 may collect the traffic information or process the traffic information. As an exemplary embodiment of the present disclosure, the traffic information server 330 may include a server that collects the traffic information and a server that processes the traffic information.

According to an exemplary embodiment of the present disclosure, the traffic information server 330 may be configured to generate lane-basis route guidance information based on the lane-basis location data of the vehicle 314. The lane-basis route guidance information may include information on whether the lane is congested determined on the lane basis and information on a route guided on the lane basis. The traffic information server 330 may transmit data including the lane-basis route guidance information to other vehicles 340. In this regard, other vehicles 340 that receives the data including the lane-basis route guidance information may include both vehicles that are able to perform precise positioning and vehicles that are not able to perform the precise positioning.

According to an exemplary embodiment of the present disclosure, other vehicles 340 may use the data including the lane-basis route guidance information to provide at least one of the information on whether the lane is congested determined on the lane basis or the information on the route guided on the lane basis, or any combination thereof to the user.

According to an exemplary embodiment according to FIG. 3, the user may receive guidance of an optimal route to reach a destination by receiving the lane-basis traffic information or the lane-basis route guidance information, regardless of whether the vehicle being used is able to perform the precise positioning.

Figure 4:
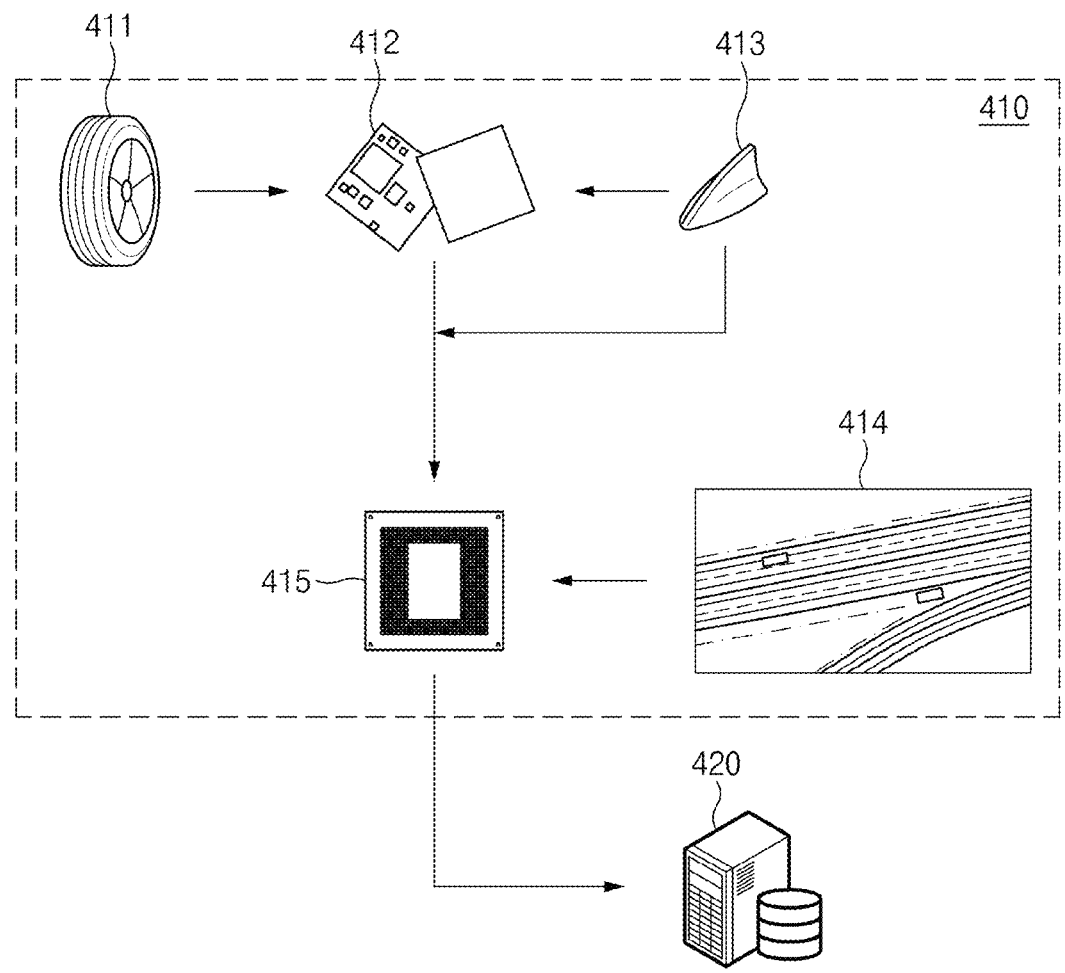
FIG. 4 is a diagram showing an example of a concept in which a vehicle including a vehicle control device according to an exemplary embodiment of the present disclosure generates lane-basis travel data and transmits the lane-basis travel data to a traffic information server.

FIG. 4 is a diagram showing an example of a concept in which a vehicle including a vehicle control device according to an exemplary embodiment of the present disclosure generates lane-basis travel data and transmits the lane-basis travel data to a traffic information server.

According to an exemplary embodiment of the present disclosure, a vehicle 410 may measure a travel distance of the vehicle 410 via a distance measurement sensor 411. For example, the distance measurement sensor 411 may measure the distance traveled by the vehicle 410 using the number of times a wheel of the vehicle 410 rotated and a circumference value of the wheel of the vehicle 410.

According to an exemplary embodiment of the present disclosure, the vehicle 410 may receive a GNSS signal from a satellite or receive data from an external server via an antenna 413. For example, the data received from the external server may include satellite information, information for dead reckoning (DR) positioning, correction information for correcting a location of the vehicle, and the like.

According to an exemplary embodiment of the present disclosure, a processor 412 of the vehicle 410 may collect the travel distance of the vehicle 410, the satellite information, the information for the DR positioning, the correction information, and the like. For example, the processor 412 may be configured to determine location data of the vehicle 410 based on the travel distance of the vehicle 410, the satellite information, the information for the DR positioning, the correction information, and the like.

According to an exemplary embodiment of the present disclosure, the processor 412 of the vehicle 410 may transmit the location data of the vehicle 410 to a navigation application 415. The navigation application 415 may collect the location data of the vehicle 410 and high definition map data 414. The navigation application 415 may be configured to generate the location data of the vehicle 410 on a lane basis by map matching the high definition map data 414 to the location data of the vehicle 410.

According to an exemplary embodiment of the present disclosure, the navigation application 415 may transmit the lane-basis location data of the vehicle 410 to a traffic information server 420.

According to an exemplary embodiment of the present disclosure, the traffic information server 420 may be configured to generate lane-basis route guidance information using the received lane-basis location data of the vehicle 410.

Figure 5:
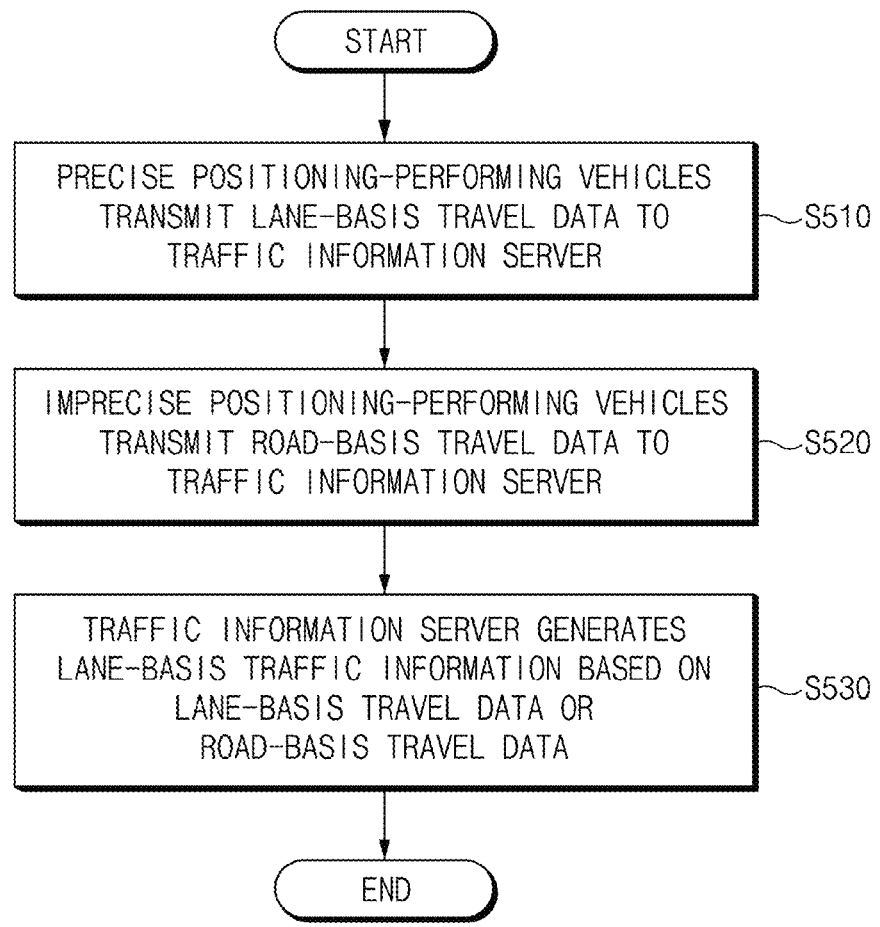
FIG. 5 is a flowchart for illustrating a traffic information server, a device for controlling a vehicle, or a method for providing traffic information according to an exemplary embodiment of the present disclosure.

FIG. 5 is a flowchart for illustrating a traffic information server, a device for controlling a vehicle, or a method for providing traffic information according to an exemplary embodiment of the present disclosure.

According to an exemplary embodiment of the present disclosure, the precise positioning-performing vehicles that perform the precise positioning on the lane basis may transmit the lane-basis travel data to the traffic information server (S510). The lane-basis travel data may include at least one of the lane-basis locations of the precise positioning-performing vehicles or the velocities of the precise positioning-performing vehicles, or any combination thereof.

For example, the precise positioning-performing vehicle may use the positioning technology based on at least one of the global positioning system (GPS) or the global navigation satellite system (GNSS), or any combination thereof to correct the location of the vehicle to the lane-basis location of the precise positioning-performing vehicle including the location in the sub-meter unit.

According to an exemplary embodiment of the present disclosure, the imprecise positioning-performing vehicles that are not able to perform the precise positioning may transmit the road-basis travel data to the traffic information server (S520). The road-basis travel data may include at least one of the road-basis locations of the imprecise positioning-performing vehicles or the velocities of the imprecise positioning-performing vehicles, or any combination thereof.

For example, the imprecise positioning-performing vehicles may use the dead reckoning (DR) technology based on at least one of information on the velocities of the imprecise positioning-performing vehicles, information on gyro of the imprecise positioning-performing vehicles, or information on travel directions of the imprecise positioning-performing vehicles, or any combination thereof to correct the locations of the imprecise positioning-performing vehicles to the road-basis locations of the imprecise positioning-performing vehicles.

According to an exemplary embodiment of the present disclosure, the above-described operations S510 and S520 may not be restricted in order. For example, the operation of transmitting, by the precise positioning-performing vehicles, the lane-basis travel data to the traffic information server and the operation of transmitting, by the imprecise positioning-performing vehicles, the road-basis travel data to the traffic information server may be performed simultaneously.

According to an exemplary embodiment of the present disclosure, the traffic information server may be configured to generate the lane-basis traffic information based on at least one of the lane-basis travel data or the road-basis travel data, or any combination thereof (S530).

According to an exemplary embodiment of the present disclosure, the traffic information server may be configured to generate the lane-basis route guidance information including at least one of the data on whether the lane is congested determined on the lane basis or the data on the route guided on the lane basis, or any combination thereof, based on the traffic information.

According to an exemplary embodiment of the present disclosure, the traffic information server may transmit the data regarding the lane-basis route guidance information to at least one of the precise positioning-performing vehicles or the imprecise positioning-performing vehicles, or any combination thereof.

Figure 6:
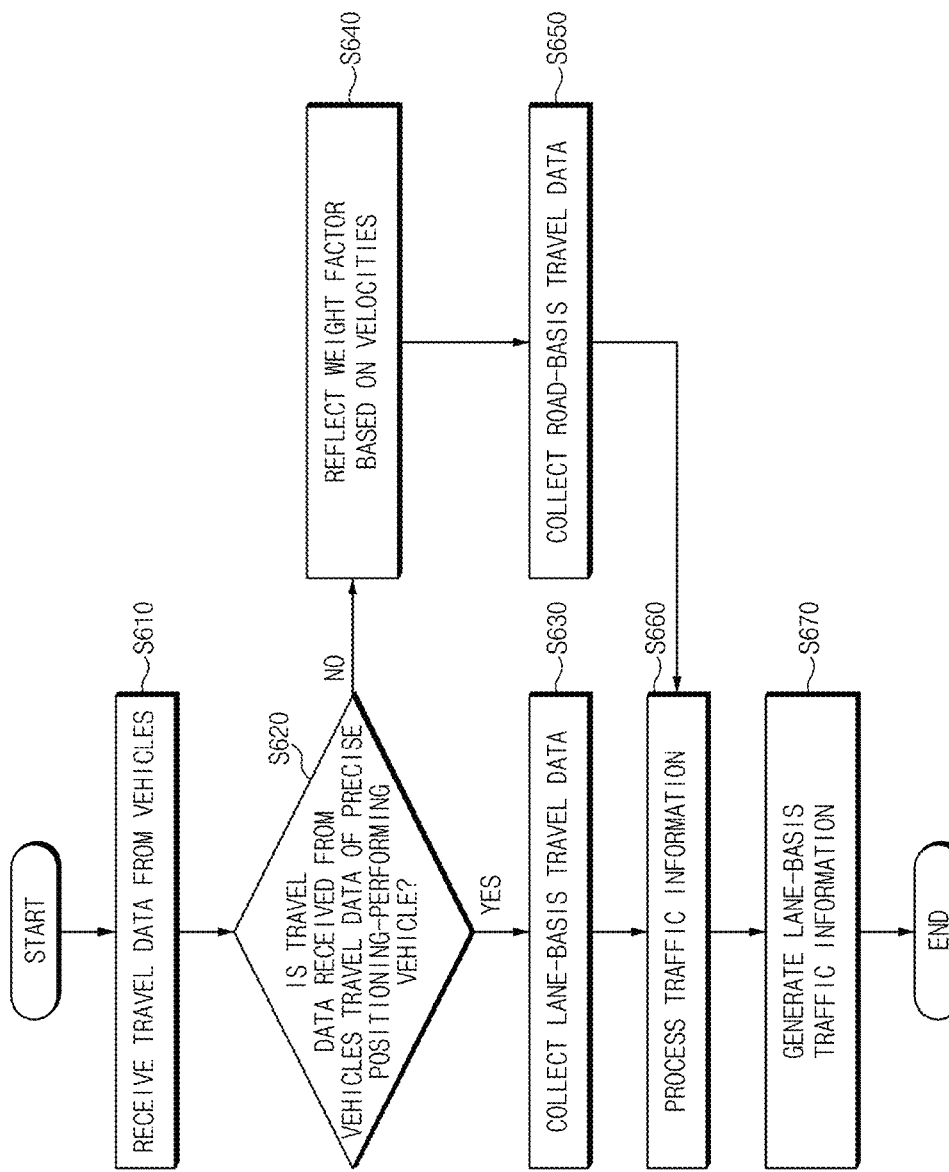
FIG. 6 is a flowchart for illustrating an example in which a type of data collected varies in accordance with whether it is travel data of a precise positioning-performing vehicle in a traffic information server, a device for controlling a vehicle, or a method for providing traffic information according to an exemplary embodiment of the present disclosure.

FIG. 6 is a flowchart for illustrating an example in which a type of data collected varies depending on whether it is travel data of a precise positioning-performing vehicle in a traffic information server, a device for controlling a vehicle, or a method for providing traffic information according to an exemplary embodiment of the present disclosure.

According to an exemplary embodiment of the present disclosure, the traffic information server may receive the travel data from the vehicles (S610). The travel data may include the locations of the vehicles, the velocities of the vehicles, and the like.

According to an exemplary embodiment of the present disclosure, the traffic information server may be configured to determine whether the travel data received from the vehicles is the travel data of the precise positioning-performing vehicle (S620). Whether the travel data is the travel data of the precise positioning-performing vehicle may be determined based on whether the travel data includes the information on the lane-basis location.

For example, if travel data received from a first vehicle includes information on which lane the first vehicle is traveling in, the traffic information server may be configured to determine that the first vehicle corresponds to the precise positioning-performing vehicle.

As an exemplary embodiment of the present disclosure, travel data received from a second vehicle does not include information on which lane the second vehicle is traveling in, but includes only information on a road on which the second vehicle is traveling, the traffic information server may be configured to determine that the second vehicle does not correspond to the precise positioning-performing vehicle.

According to an exemplary embodiment of the present disclosure, if the travel data of the precise positioning-performing vehicle is received, the traffic information server may collect the lane-basis travel data (S630). The lane-basis travel data may include information on the lane in which the precise positioning-performing vehicle is traveling and information on the velocity of the precise positioning-performing vehicle in the corresponding lane.

According to an exemplary embodiment of the present disclosure, if the travel data of the imprecise positioning-performing vehicle that does not correspond to the precise positioning-performing vehicle is received, the traffic information server may reflect the factor value regarding the weight based on the velocities of the imprecise positioning-performing vehicles to the road-basis travel data (S640). The factor value regarding the weight based on the velocities of the imprecise positioning-performing vehicles may be determined based on the degree of the traffic congestion determined based on the velocities of the imprecise positioning-performing vehicles.

According to an exemplary embodiment of the present disclosure, the traffic information server may collect the road-basis travel data reflecting the factor value (S650). The road-basis travel data reflecting the factor value may include information on the road on which the imprecise positioning-performing vehicle is traveling and information on the velocity of the imprecise positioning-performing vehicle on the corresponding road.

According to an exemplary embodiment of the present disclosure, the traffic information server may be configured for processing the traffic information based on the lane-basis travel data and the road-basis travel data (S660).

According to an exemplary embodiment of the present disclosure, the traffic information server may be configured to generate the lane-basis traffic information based on the processed traffic information (S670). The lane-basis traffic information may include the lane-basis route guidance information. The lane-basis route guidance information may include the data on whether the lane is congested and the data on the route guided on the lane basis.

According to an exemplary embodiment of the present disclosure, the traffic information server may transmit the lane-basis traffic information to the vehicles including the precise positioning-performing vehicles and the imprecise positioning-performing vehicles. The vehicles that have received the lane-basis traffic information may provide the lane-basis traffic information or the lane-basis route guidance information to the users.

The lane-basis traffic information or the lane-basis route guidance information may be provided to the users via a display or an audio of the vehicle.

Figure 7:
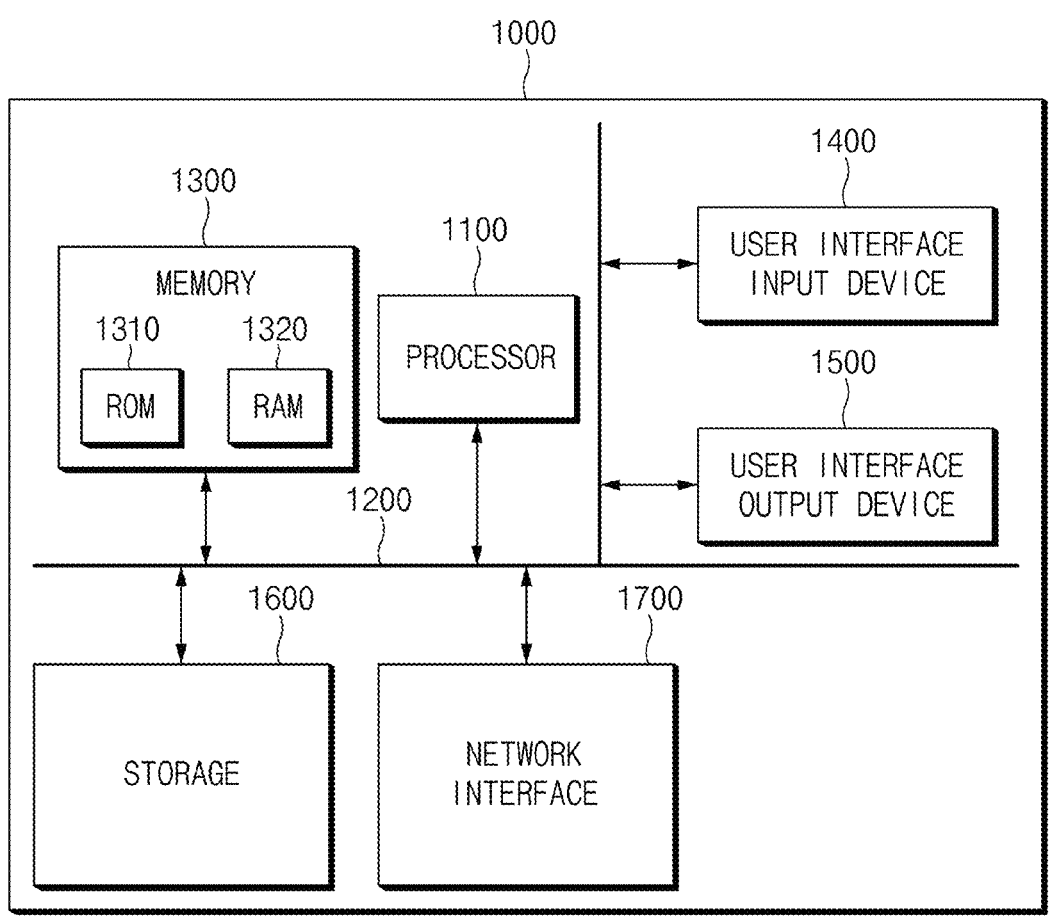
FIG. 7 illustrates a computing system related to a traffic information server, a device for controlling a vehicle, or a method for providing traffic information according to an exemplary embodiment of the present disclosure.

FIG. 7 illustrates a computing system related to a traffic information server, a device for controlling a vehicle, or a method for providing traffic information according to an exemplary embodiment of the present disclosure.

With reference to FIG. 7, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that is configured to perform processing on commands stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the exemplary embodiments included in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present technology may collect the travel data of the vehicles on the lane basis and generate the lane-basis traffic information to improve the accuracy of the traffic information, the estimated time of arrival, and the route guidance provided to the user.

Furthermore, the present technology may provide the information on whether there is the traffic congestion for each lane to the user via the lane-basis traffic information if there is the plurality of lanes on the route of the user.

Furthermore, the present technology may provide the lane-basis traffic information to the vehicle provided with the precise positioning technology and the vehicle not provided with the precise positioning technology, so that the user using the vehicle not provided with the precise positioning technology may also receive the information on whether there is the traffic congestion for each lane.

Furthermore, various effects that are directly or indirectly identified through the present specification may be provided.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A traffic information server comprising:
   a first memory configured to store program instructions; and
   a first processor operatively connected to the first memory and configured to execute the program instructions,
   wherein the first processor is configured to:
      receive in real time, from precise positioning-performing vehicles using positioning technologies by use of a satellite and configured to perform precise positioning on a lane basis, lane-basis travel data including at least one of lane-basis locations of the precise positioning-performing vehicles or velocities of the precise positioning-performing vehicles, or any combination thereof;
      receive in real time, from imprecise positioning-performing vehicles incapable of performing the precise positioning, road-basis travel data including at least one of road-basis locations of the imprecise positioning-performing vehicles or velocities of the imprecise positioning-performing vehicles, or any combination thereof; and
      generate lane-basis traffic information based on at least one of the lane-basis travel data or the road-basis travel data, or any combination thereof, wherein a lane where the precise positioning-performing vehicles are traveling is included on a road where the imprecise positioning-performing vehicles are traveling, wherein the first processor is further configured to generate lane-basis route guidance information including at least one of data on whether the lane is congested determined on the lane basis or data on a route guided on the lane basis, or any combination thereof, based on the lane-basis traffic information, and wherein the first processor is further configured to transmit data regarding the lane-basis route guidance information to at least one of the precise positioning-performing vehicles or the imprecise positioning-performing vehicles, or any combination thereof.

2. The traffic information server of claim 1, wherein the first processor is further configured to generate the lane-basis traffic information by reflecting a factor value regarding a weight based on the velocities of the imprecise positioning-performing vehicles to the road-basis travel data.

3. The traffic information server of claim 1, wherein the lane-basis locations of the precise positioning-performing vehicles are generated as a high definition map including at least one of lane information, a guardrail, a curvature of the road, a slope of the road, a traffic light location, a sign location, or a traffic marking, or any combination thereof is map matched with location data of the precise positioning-performing vehicles.

4. An apparatus for controlling a vehicle, the apparatus comprising:
    a second memory configured to store program instructions; and
    a second processor operatively connected to the second memory and configured to execute the program instructions,
    wherein the second processor is configured to:
        transmit travel data of a host vehicle including at least one of a location of the host vehicle or a velocity of the host vehicle, or any combination thereof to a traffic information server; and
        receive in real time, from the traffic information server, lane-basis traffic information generated based on at least one of lane-basis travel data of other vehicles configured to perform precise positioning on a lane basis, road-basis travel data of other vehicles incapable of performing the precise positioning, or the travel data of the host vehicle, or any combination thereof,
    wherein a lane where the other vehicles configured to perform the precise positioning are traveling is included in a road where the other vehicles incapable of performing the precise positioning are traveling,
    wherein the lane-basis travel data of the other vehicles configured to perform the precise positioning includes at least one of lane-basis locations of the other vehicles configured to perform the precise positioning or velocities of the other vehicles configured to perform the precise positioning in the lane, or any combination thereof,
    wherein the road-basis travel data of the other vehicles incapable of performing the precise positioning includes at least one of road-basis locations of the other vehicles incapable of performing the precise positioning or velocities of the other vehicles incapable of performing the precise positioning on the road, or any combination thereof, and
    wherein the second processor is further configured to receive in real time lane-basis route guidance information including at least one of data on whether the lane is congested determined on the lane basis or data on a route guided on the lane basis, or any combination thereof among the lane-basis traffic information.

5. The apparatus of claim 4, wherein the second processor is further configured to transmit lane-basis travel data of the host vehicle, including at least one of a lane-basis location of the host vehicle or a velocity of the host vehicle in the lane, or any combination thereof, to the traffic information server among the travel data of the host vehicle, based on a fact that the host vehicle corresponds to a precise positioning-performing vehicle configured to perform the precise positioning on the lane basis.

6. The apparatus of claim 5, wherein the second processor is further configured to map match a high definition map including at least one of lane information, a guardrail, a curvature of the road, a slope of the road, a traffic light location, a sign location, or a traffic marking, or any combination thereof with location data of the host vehicle to generate the lane-basis location of the host vehicle.

7. The apparatus of claim 4, wherein the second processor is further configured to correct the location of the host vehicle to a lane-basis location of the host vehicle including a location in a sub-meter unit using a positioning technology based on at least one of a global positioning system (GPS) or a global navigation satellite system (GNSS), or any combination thereof, based on a fact that the host vehicle corresponds to a precise positioning-performing vehicle configured to perform the precise positioning on the lane basis.

8. The apparatus of claim 4, wherein the second processor is further configured to transmit road-basis travel data of the host vehicle, including at least one of a road-basis location of the host vehicle or a velocity of the host vehicle on the road, or any combination thereof, to the traffic information server among the travel data of the host vehicle, based on a fact that the host vehicle does not correspond to a precise positioning-performing vehicle configured to perform the precise positioning on the lane basis.

9. The apparatus of claim 4, wherein the second processor is further configured to correct the location of the host vehicle to a road-basis location of the host vehicle using a dead reckoning (DR) technology based on at least one of information on the velocity of the host vehicle, information on a gyro of the host vehicle, or information on a travel direction of the host vehicle, or any combination thereof, based on a fact that the host vehicle does not correspond to a precise positioning-performing vehicle configured to perform the precise positioning on the lane basis.

10. The apparatus of claim 4, wherein the second processor is further configured to provide information on at least one of whether a left-turn lane is congested, whether a right-turn lane is congested, whether a straight lane is congested, or whether a U-turn lane is congested, or any combination thereof to a user by being differentiated for each lane, based on the lane-basis route guidance information.

11. A method for providing traffic information, the method comprising:
    transmitting in real time, by precise positioning-performing vehicles using positioning technologies by use of a satellite and configured to perform precise positioning on a lane basis, lane-basis travel data including at least one of lane-basis locations of the precise positioning-performing vehicles or velocities of the precise positioning-performing vehicles, or any combination thereof to a traffic information server;

transmitting in real time, by imprecise positioning-performing vehicles incapable of performing the precise positioning, road-basis travel data including at least one of road-basis locations of the imprecise positioning-performing vehicles or velocities of the imprecise positioning-performing vehicles, or any combination thereof to the traffic information server;

generating, by the traffic information server, lane-basis traffic information based on at least one of the lane-basis travel data or the road-basis travel data, or any combination thereof, wherein a lane where the precise positioning-performing vehicles are traveling is included on a road where the imprecise positioning-performing vehicles are traveling;

generating, by the traffic information server, lane-basis route guidance information including at least one of data on whether the lane is congested determined on the lane basis or data on a route guided on the lane basis, or any combination thereof, based on the traffic information; and transmitting, by the traffic information server, data regarding the lane-basis route guidance information to at least one of the precise positioning-performing vehicles or the imprecise positioning-performing vehicles, or any combination thereof.

12. The method of claim 11, wherein the transmitting, by the precise positioning-performing vehicles configured to perform the precise positioning on the lane basis, of the lane-basis travel data including at least one of the lane-basis locations of the precise positioning-performing vehicles or the velocities of the precise positioning-performing vehicles, or any combination thereof to the traffic information server includes:

correcting, by the precise positioning-performing vehicle, the location of the precise positioning-performing vehicle to a lane-basis location of the precise positioning-performing vehicle including a location in a sub-meter unit using a positioning technology based on at least one of a global positioning system (GPS) or a global navigation satellite system (GNSS), or any combination thereof.

13. The method of claim 11, wherein the transmitting, by the imprecise positioning-performing vehicles incapable of performing the precise positioning, of the road-basis travel data including at least one of the road-basis locations of the imprecise positioning-performing vehicles or the velocities of the imprecise positioning-performing vehicles, or any combination thereof to the traffic information server includes:

correcting, by the imprecise positioning-performing vehicles, the locations of the imprecise positioning-performing vehicles to road-basis locations of the imprecise positioning-performing vehicles using a dead reckoning (DR) technology based on at least one of information on the velocities of the imprecise positioning-performing vehicles, information on a gyro of the imprecise positioning-performing vehicles, or information on a travel direction of the imprecise positioning-performing vehicles, or any combination thereof.

14. The method of claim 11, wherein the generating, by the traffic information server, of the lane-basis traffic information based on at least one of the lane-basis travel data or the road-basis travel data, or any combination thereof includes:

generating, by the traffic information server, the lane-basis traffic information by reflecting a factor value regarding a weight based on the velocities of the imprecise positioning-performing vehicles to the road-basis travel data.

15. The method of claim 11, further including:

providing, by the vehicles that have received the data regarding the lane-basis route guidance information, information on at least one of whether a left-turn lane is congested, whether a right-turn lane is congested, whether a straight lane is congested, or whether a U-turn lane is congested, or any combination thereof to a user by being differentiated for each lane, based on the lane-basis route guidance information.

* * * * *